No. 690,163. Patented Dec. 31, 1901.
W. LAY.
VALVE GEAR FOR ENGINES.
(Application filed Dec. 17, 1900.)
(No Model.) 2 Sheets—Sheet 2.

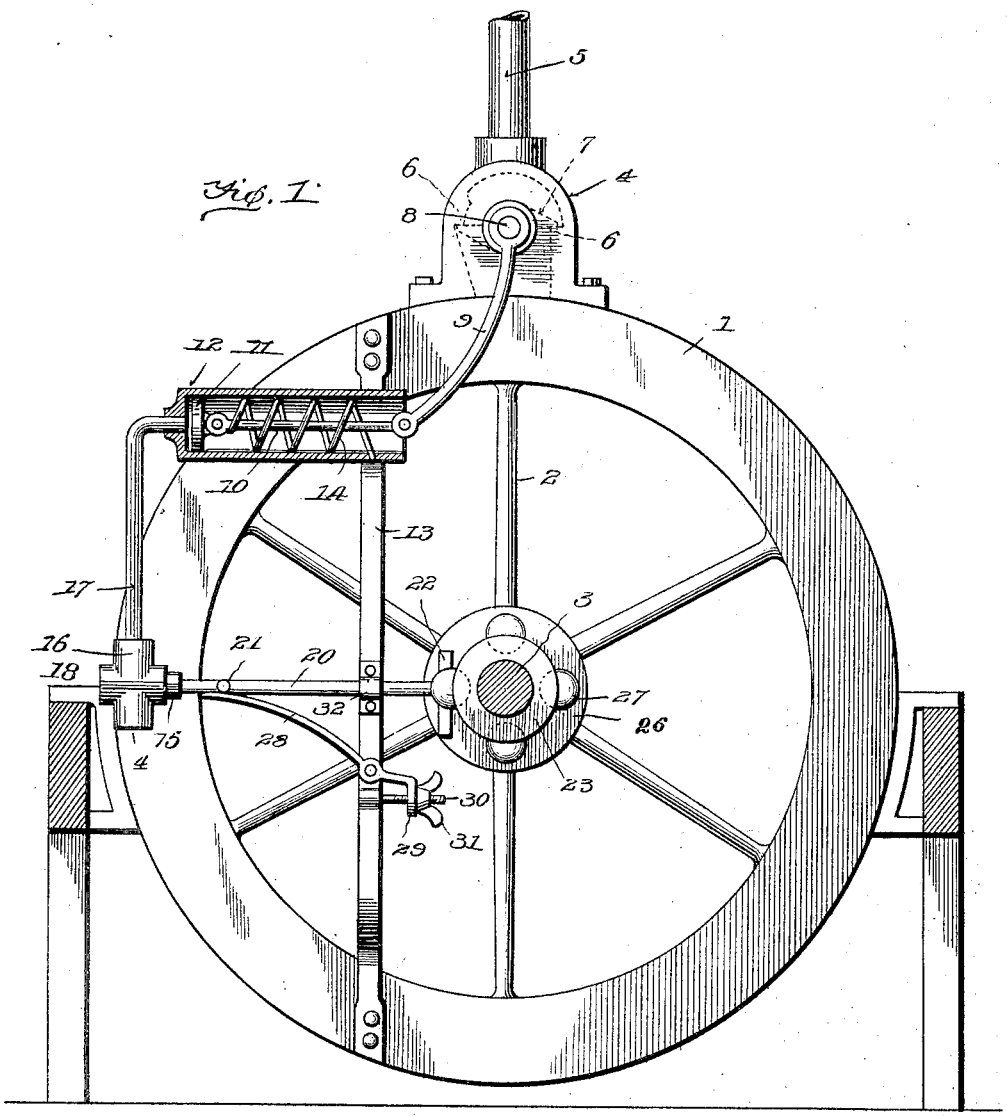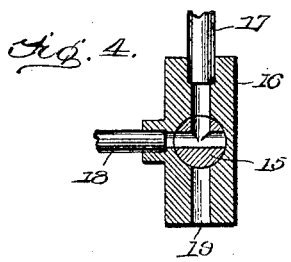

Witnesses
Harry S. Rohrer
Herbert D. Lawson

Inventor:
William Lay.
By Victor J. Evans Attorney

UNITED STATES PATENT OFFICE.

WILLIAM LAY, OF KREMLIN, OKLAHOMA TERRITORY.

VALVE-GEAR FOR ENGINES.

SPECIFICATION forming part of Letters Patent No. 690,163, dated December 31, 1901.

Application filed December 17, 1900. Serial No. 40,157. (No model.)

*To all whom it may concern:*

Be it known that I, WILLIAM LAY, a citizen of the United States, residing at Kremlin, in the county of Garfield, Oklahoma Territory, have invented new and useful Improvements in Valve-Gear for Steam-Engines, of which the following is a specification.

My invention relates to improvements in valve-gear or mechanism for steam-engines; and the object is to provide an improved automatically-operating valve-controlling mechanism designed to regulate and control the throttle-valve of the engine.

The invention, with slight modifications, may be adapted for connection and association with any steam-engine; but, as illustrated, it is particularly designed for use in connection with rotary steam-engines. I have shown the mechanism as connected to a rotary steam-engine consisting of an annular ring or casing and a rotative piston inclosed in the casing, the spokes of the piston radiating from a hub concentric with the casing and mounted on a suitable shaft. I have not shown the construction of the piston, because the construction of piston and casing is immaterial to the application and adaptation of the invention, and it can be applied to rotary engines having the usual cylindrical casings and interior concentric pistons.

I have fully and clearly illustrated the invention in the accompanying drawings, to be taken as a part hereof, and wherein—

Figure 2:
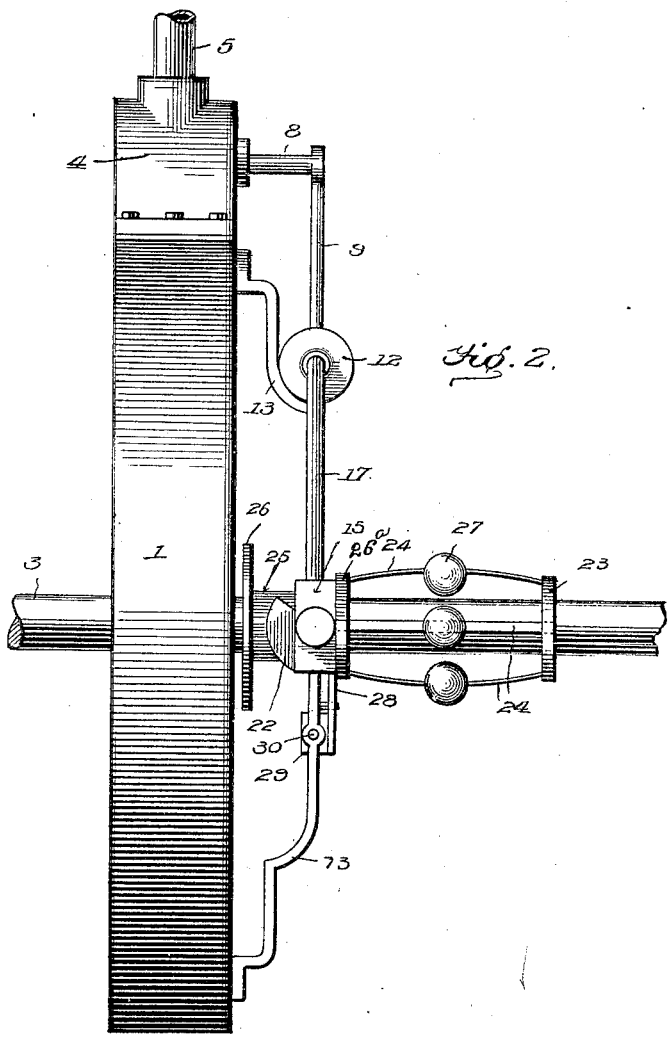
Figure 3:
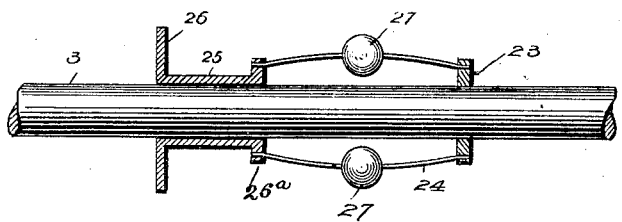

Figure 1 is a view in elevation, partly in section, showing my improvement attached to a rotary engine. Fig. 2 is a side view of the engine, showing the valve-gear in end view and the governor in side view. Fig. 3 is a longitudinal sectional view through the sliding sleeve and governor as mounted on the engine-shaft. Fig. 4 is a vertical section through the valve-casing or chamber 16 and transverse section through the three-way valve.

Referring to the drawings, 1 designates a circular casing for a rotary engine, wherein is located and inclosed a revoluble or rotative piston carried on spokes 2, emanating from a hub mounted on a shaft 3. The piston is not shown; but it may be stated that it is of a construction shown in my certain other application for patent for rotary engine bearing Serial No. 40,157, filed on the 17th day of December, 1900.

On the casing 1 is formed or suitably secured thereto a valve-chamber 4 of any proper construction, having the steam-pipe 5, leading from a steam source connected therewith and opening therein, and of course a port (not shown) opens from the valve-chamber into the casing of the engine. In the valve-chamber 4 are formed oppositely-disposed shoulders or seats 6 6, with which an oscillating valve 7 engages to close the passage or steam-port through the valve-chamber, as indicated in dotted lines in Fig. 1 of the drawings. The stem of the valve 7 projects through a wall of the valve-chamber, as at 8, and has mounted thereon an arm 9.

Suitably supported against the engine-casing and resting on and secured to a bracket-rod 13 is a horizontally-arranged cylinder 12, having an open inner end and a closed outer end or head. In the cylinder 12 is disposed a plunger 11, having its inner face pivotally secured to a plunger-rod 10, the inner end of which rod is pivotally connected to the lower end of the arm 9, depending from the stem of the throttle-valve. In the cylinder 12 about the rod 10 is arranged an expansible spiral spring 14, having one end fixed in the cylinder adjacent to the open end and the other end secured to the plunger 11. In the head of the cylinder 12 a steam-pipe 17 opens. The lower end of said pipe opens into a valve-chamber 16, as shown, so that steam being let through the pipe 17 into the cylinder and against the plunger-head the force thereof will move the plunger toward the open end of the cylinder, carrying with it against the force of the spring 14 the depending arm 9 and opening the throttle-valve.

In the valve-chamber 16 a steam-pipe 18 leads from a suitable source of steam, a proper valve (not shown) being interposed in such pipe to regulate the flow of steam. The valve-chamber 16 is intersected by a central steam-passage, as shown, the upper portion of which connects with the steam-pipe 17 and the lower portion 19 thereof constituting an exhaust-passage when the valve in this chamber is turned to bring the horizontal way or passage in the valve in line with the pipe 17 and exhaust port or passage 19. In the chamber 16 is arranged a three-way valve 15, the passages through which are shown in Fig. 4 of the drawings. The stem of this valve 15 projects laterally from the chamber 16 and has connected thereto a horizontally-extending stem or rod 20, journaled in a supporting-bearing 32, secured to the bracket or rod 13, and at its inner or free end is formed with or has secured thereto a cam-block 22, the cam-face of which is engaged by the annular flange 26 on the sleeve 25, mounted on the engine-shaft, as hereinafter specified and for the purpose stated. In the stem or rod 20 is fixed a pin 21, extending at right angles from the rod. On the rod or bracket 13 is pivotally secured a resilient arm 28, the free end of which bears under and against the pin 21 to exert a force to turn the valve-stem 20, as hereinafter stated. The resilient arm 28 is extended rearward beyond its pivotal support and is formed with a downward-extending lug 29, which engages over a projecting threaded pin 30, secured in the bracket-rod 13, and on the pin 30 is arranged a thumb-nut 31, whereby the tension or force of the resilient arm 28 may be regulated. It will be perceived that pressure by the nut 31 on the lug 29 will tend to lift or move the arm 28 upward and at the same time prevent the valve-stem 20 from being moved too far around and also will restore it to normal relation after the flange and cam are disengaged.

On the engine-shaft 3 is slidingly mounted a sleeve 25, splined to the shaft to rotate therewith. On the inner end of this sleeve 25 or the end adjacent to the engine-cylinder is formed a broad annular flange 26, which under the circumstances hereinafter mentioned engages the cam 22 and actuates the valve-stem 20. At the outer end of the sleeve 25 is formed an annular flange 26ª, in which the ends of the governor-springs 24 are fixed, the other ends of the springs being secured in an annular collar 23, fixed rigid on the engine-shaft. On each of the governor-springs 24 at their middle is mounted and secured a metal ball 27, constituting the weights of the governor, which act in the usual manner to expand and contract under the impulse of varying speed of rotation.

The operation of the valve-gearing may be stated as follows: The parts being in the relative position indicated in the drawings, the throttle-valve 7 and the exhaust-port of the valve-chamber 16 are both closed and the steamway or passage through pipe 16, three-way valve 15, and pipe 17 open and clear to admit steam to the cylinder 12 against the plunger 11, which by the force of the spring 14 rests against the end of the cylinder and closes the end of the pipe 17. Now when steam is let through the pipe 18, valve 15, and pipe 17 it exerts its force on the plunger, driving that element back and moving the valve-arm 9 to open the throttle-valve to admit steam through the pipe 5 into the engine. The action of the steam on the engine-piston causes that element to rotate and of course revolves the engine-shaft on which the governor is mounted, and according to the speed of revolution through the action of the expansion of the springs of the governor pulls the sleeve 25 lengthwise on the engine-shaft until the annular flange 26 contacts with the cam on the valve-stem 20, turns that on its axis, and with it the three-way valve 15, to reduce or prevent the flow of steam into the pipe 17, and consequently reducing or removing the pressure on the plunger, so that the force of the spring 14 acts to push back the plunger and coincidently swing the valve-arm 9 to close or partially close the throttle-valve and stop the engine or reduce its speed. As the speed of the engine is reduced the sleeve-flange 26 moves gradually away from contact with the cam 22, and the valve-stem, with the valve 15, is turned, so that it will again gradually through the force of the arm 28 admit steam to the plunger-cylinder, and thus the regulation of the speed of the engine is regular, reliable, and certain.

What I claim is—

1. The combination with the casing, a piston in the casing, and the engine-shaft, of a centrifugal governor on the engine-shaft, a sleeve revolubly and slidingly mounted on the engine-shaft and connected to the governor, and formed with an annular flange, a throttle-valve to admit steam to the casing, a cylinder on the casing, a plunger in the cylinder connected to the stem of the throttle-valve, and a steam-pipe opening into the cylinder to admit steam therein and actuate the plunger.

2. The combination with the casing, a piston in the casing, and the engine-shaft, of a centrifugal governor on the engine-shaft, a sleeve revolubly and slidingly mounted on the engine-shaft and connected to the governor and formed with an annular flange, a throttle-valve to admit steam to the casing, a depending arm secured to the stem of the throttle-valve, a cylinder on the casing, a plunger in the cylinder having its stem connected to the valve-arm, and a steam-pipe opening into the cylinder to admit steam therein and actuate the plunger.

3. The combination with the engine-shaft and the throttle-valve, of a centrifugal governor mounted on the shaft, a sleeve slidably mounted upon the engine-shaft, and connected to the governor, a valve having a stem turned by contact with the sleeve, a steam-pipe connected to the latter valve, and a plunger actuated by steam through said pipe and connected to the throttle-valve.

4. The combination with the engine-shaft, of a governor mounted thereon, a sleeve slidably mounted on the said shaft and connected to the governor and formed with an annular flange, a valve provided with a stem, a cam on the end of the stem in engagement with the flange of the sleeve, and means for resisting the rotation of the valve-stem.

5. The combination with the engine-shaft, of a centrifugal governor thereon, a sleeve rotating with the shaft and rotatable therewith formed with an annular flange, a steam-valve formed with a stem, a cam on the stem in the path of the said flange, a laterally-projecting pin in the valve-stem, and a resilient arm arranged to bear upon the pin and resist the free revolution thereof.

6. The combination with the casing, a piston in the casing, and the engine-shaft, of a governor on the shaft, and revolving therewith, a sleeve revolubly and slidingly mounted on the engine-shaft, and connected to the governor and formed with an annular flange, a throttle-valve, a cylinder, a plunger in the cylinder connected to the throttle-valve, an expansible spring to hold the plunger in normal position, a steam-pipe to carry steam to actuate the plunger, a valve, to control the advent of steam to said pipe, formed with a stem, a cam on the end of the valve-stem, arranged to be contacted by the flange of the sleeve, to rotate the stem, and a resilient resisting-arm to resist and prevent the complete rotation of the valve-stem and to restore it to normal position.

In testimony whereof I affix my signature in presence of two witnesses.

WILLIAM LAY.

Witnesses:
  J. A. BURNETTE,
  W. E. COGDOL.